Mar. 5, 1929.   T. S. CURTIS   1,703,871
APPARATUS FOR MAKING CERAMIC ARTICLES
Filed Nov. 16, 1926   2 Sheets-Sheet 1
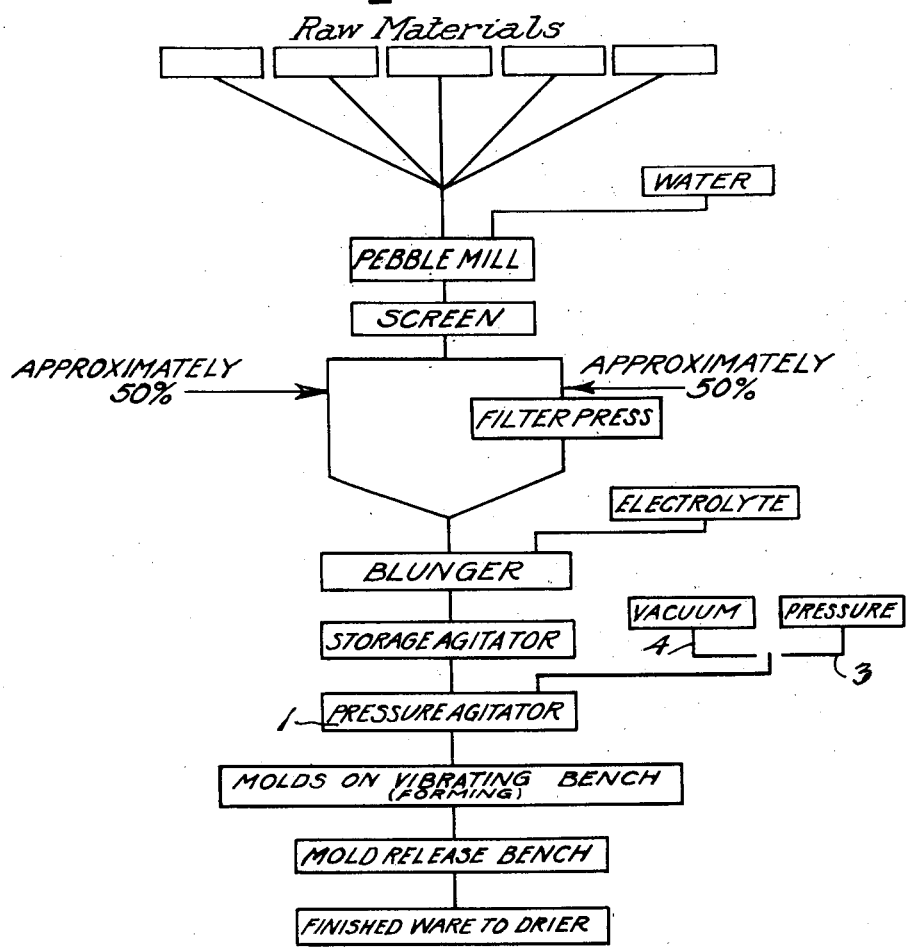
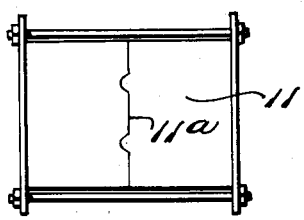
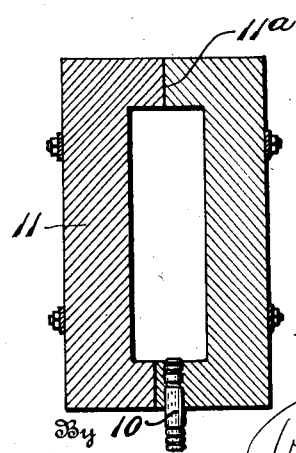

Mar. 5, 1929.　　　T. S. CURTIS　　　1,703,871
APPARATUS FOR MAKING CERAMIC ARTICLES
Filed Nov. 16, 1926　　2 Sheets-Sheet 2

Inventor
Thomas S. Curtis
By
Robb, Robb & Hill
Attorneys

Patented Mar. 5, 1929.

1,703,871

UNITED STATES PATENT OFFICE.

THOMAS S. CURTIS, OF HUNTINGTON PARK, CALIFORNIA, ASSIGNOR TO THE VITRE-FRAX CORPORATION, OF HUNTINGTON PARK, CALIFORNIA.

APPARATUS FOR MAKING CERAMIC ARTICLES.

Application filed November 16, 1926. Serial No. 148,709.

This invention comprises certain apparatus for making ceramic articles, or the like. The apparatus hereinafter described is designed for use especially to practice a novel process of forming ceramic or molded manufactures, with resultant advantages of prime importance in the arts as regards facility with which articles of super-strength and super-refractory qualities, wholly lacking any plastic or clay content may be made; homogeneity of the final product, whether including or not includng a plastic in its body composition; saving of time and labor; high rate of mold turnover, and other factors of importance never before achieved in the ceramic arts so far as I am advised, all of which will appear more fully as this description proceeds.

Since the said apparatus may have a larger field of application than to the ceramic art, I do not wish to limit myself to the latter in stating the scope of my invention and its possible utility.

By my invention hereinafter set forth, in practical effect, I have produced apparatus affording a new forming technique, which in the ceramic art alone, enormously cheapens and simplifies certain ceramic manufactures beyond the range of anything accomplishable by methods and apparatus known today, for the special reason that by this invention, body composition of totally non-plastic qualities, may be easily and homogeneously molded or formed, something not before achieved to my knowledge; and those compositions where the plastic or clay content is present, but is negligble in proportion to the whole body of the mass, may be similarly handled but with even greater facility. The importance of the foregoing will be realized when I note that for certain kinds of ceramic manufactures absence of clay or plastic substances in the composition from which they are made, is really necessary to obtain an article best serving certain particular purposes. Notwithstanding the foregoing recognized condition, it has been practically impossible before this invention to produce by any known methods or apparatus perfect or commercially adequate ceramic articles of some types needed today that are not defective in one way or another when the body composition lacks ingredients to make it plastic. I shall now attempt to bring out more in detail herein the reason for the above statement.

I refer to the accompanying drawings, illustrating one mode of preparation of a body composition which may be used in the practice of my process, and certain apparatus employed for the purposes thereof, and in said drawings:—

Figure 1 is a flow sheet view illustrative of the steps of the forming process availed of in practicing my method, for which this apparatus is used.

Figure 3 is a top plan view of one of the molds.

Figure 4 is a vertical sectional view of one of the molds.

Figure 2:
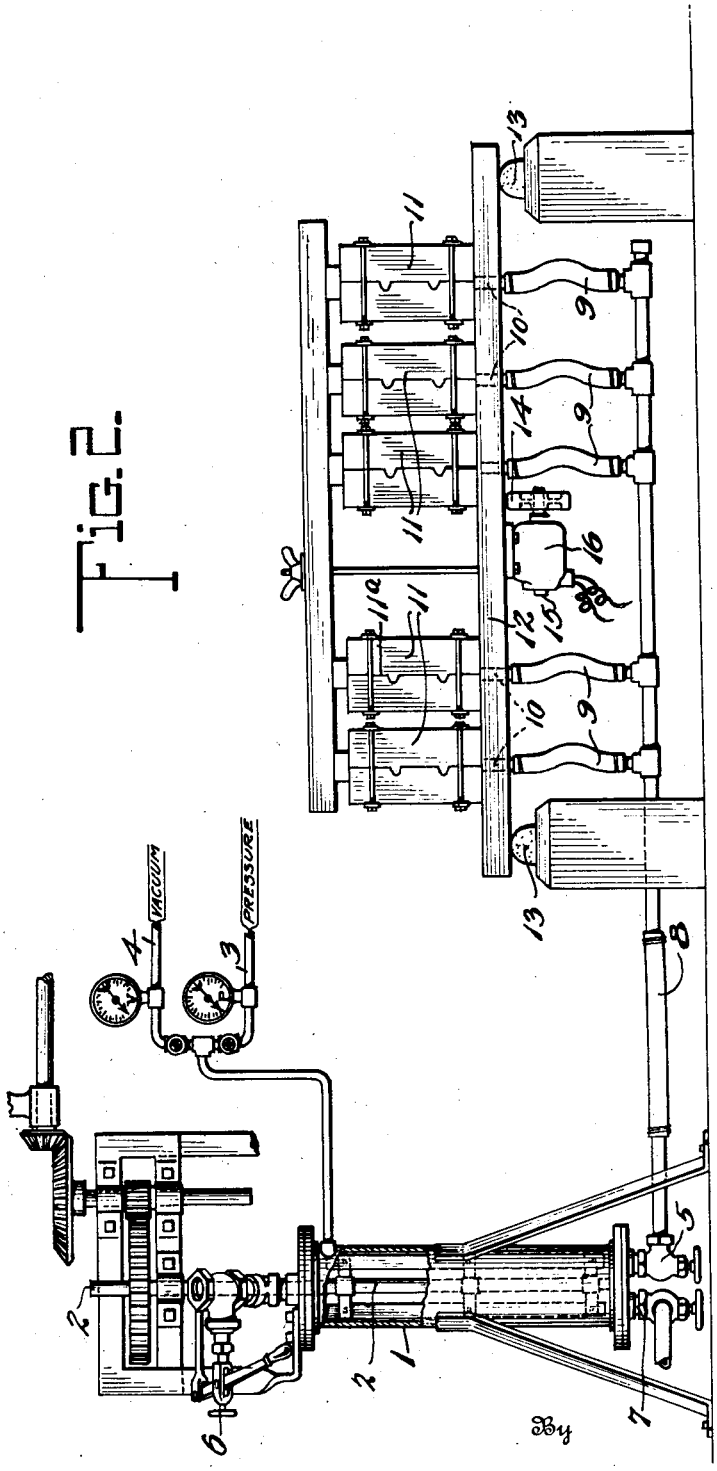
Figure 2 is a view in elevation showing my forming machine system including a typical pressure agitator and distributing system for the various molds illustrated, also the vibratable support and vibrating means for the molds and associated parts.

Considering the annexed drawings and especially the flow sheet of Figure 1, certain steps of the process in which my apparatus is used will be set forth and the apparatus itself then fully described.

Referring now to the preparation of a batch of body composition, when the latter is a typical fine body such as usual for manufacturing porcelain or other vitreous ware, I prefer to mix and grind by the common ball or pebble mill process, using sufficient water to secure efficient grinding and delivery from the mill. I then filter press a portion of this slip to remove the excess water. The balance of the slip from the mill is then charged into a blunger or other suitable mixing machine, and to this slip of low viscosity is added the filter cake of the same composition until the specific gravity of the batch has been brought up to above thirty ounces to the pint. The axact specific gravity will depend upon the body composition, but in general will be well above the gravity of ordinary casting slip which will vary from twenty-six ounces to possibly thirty ounces to the pint. The thickened slip will have assumed the consistency of jigger-mud, as previously described, by this time. Now an electrolyte is added, and the viscosity gradually lowers until the mud will no longer support its own weight so long as the agitator revolves. But once agitation has stopped, the heavy fluid starts almost immediately to solidify and if permitted to stand without agitation for more than a few minutes, it becomes so viscous as to permit cutting with a knife. The slightest movement in the mass, however, causes it to return to the fluid state.

From the foregoing, it will be noted that the body composition must be kept in motion while in storage in order to maintain it in condition for forming. I have discovered, however, that vibration of the solidified mass will again bring it to a state of fluidity so long as the water content is preserved at the proper point and if reasonable precautions are taken to prevent evaporation. This precaution is best taken by passing the body composition to a closed top agitator or mixer which prevents the escape of very much moisture laden air and in which it is stored.

Obviously such a mass having a viscosity so high that it will not flow by gravity into the cavities of a mold cannot be molded by any ordinary process of forming. Having discovered, however, that vibration maintains the mass in a state of fluidity for practically indefinite periods of time, I apply this discovery to the process of molding in the following way:

Describing more in detail, the raw materials are weighed in the usual way into a batch of the proper size to charge the pebble mill (see flow sheet). Water is added to bring the batch to the consistency of thin cream, in order that the entire contents of the pebble mill may readily be passed through the screen, which retains and discards any fragments of mill lining or pebbles, together with any imperfectly ground residue from the batch itself.

At this point, it is well to call attention to the fact that the pebble mill process of body preparation is the preferred one, since it represents modern practice and admittedly gives the best control of body structure. The older process of blunging the raw batch may be substituted for the pebble mill without departing from the spirit of the invention, however, since my process is operative with any process of body preparation that gives satisfactory results with the ordinary casting process.

The prepared body coming from the screen is shown in the flow sheet as dividing into two approximately equal volumes, one half of the flow passing through filter presses which remove the excess of water and deliver the body as filter cake. The other half of the slip passes directly to a blunger, into which is charged also the filter cake from the presses. It is necessary to point out that this division of the volume of the slip is suggestive only, the actual division or proportion of filter cake to slip being governed by the percentage of non-plastic ingredients in the body and the percentage of water in the slip. The object of filter pressing a portion of the slip is merely to afford a means of thickening the slip to the consistency of jigger-mud in the blunger, and any other means of thickening may be employed at this point without departing from the spirit of the invention.

At the blunger, the control of viscosity and specific gravity of the slip is effected. Whereas in ordinary casting processes, the gravity of the slip will usually be from twenty-seven to thirty ounces in weight to the pint, the gravity of my slip will be from thirty ounces upward depending upon the percentage of solid, non-plastic ingredients in the body composition, and the specific gravity of said solid ingredients. The viscosity of the ordinary casting slip is so low as to permit the fluid readily to run by gravity into the cavities of a plaster mold, whereas, in my process, the viscosity is so high that the slip solidifies within a few minutes after agitation has ceased so that it cannot be poured. The control at the blunger is readily maintained through visual examination once the operator has gained experience, since the process offers wide degrees of flexibility. The desired viscosity is that at which the knives of the blunger will move through the agitated fluid without causing the latter to pile up. This viscosity is easily controlled through the addition of more electrolyte, if stiffness is indicated; more filter cake, if the gravity is too low or if the mass refuses to solidify when a sample is taken out and permitted to stand without agitation; and more slip, if the viscosity and gravity have been increased so much as to cause piling up around the blunger knives. All of these adjustments may be made without varying the chemical or ceramic composition of the slip as will readily be appreciated.

Having manufactured the body under conditions of exacting control at the blunger, wherein it may remain until all physical tests have been completed to check the condition, and to correct the latter if it is faulty, the entire charge from the blunger may be transferred to the storage agitator which consists of a large storage tank of any desired capacity, preferably large enough to hold an entire day's supply of slip to guard against breakdown of the preparation machinery. The heavy slip may be stored indefinitely in a covered storage tank, providing it is kept in motion by means of a slowly moving agitator which, should however, serve the entire interior of the tank, fitting to within a short distance of the tank wall.

From the storage agitator so designated in the flow sheet illustration Figure 1, the slip is drawn as needed into pressure agitators which form the first unit of the forming machine system employed in my invention. Figure 2 illustrates a typical pressure agitator which comprises a steel tank 1. An agitator shaft 2 passes through a suitable packing gland bearing at the upper end of the tank, made air tight against one-hundred pounds pressure. Graphite gland packing has been found to be self lubricating and satisfactory to maintain the pressure. The shaft 2 is rotated at a speed of approximately eight revolutions per minute, by any suitable driving means, the details of which are unimportant herein, and said shaft working the agitating means carried thereby within the tank 1 keeps the slip in fluid condition without stirring air into the mass. The agitator blades are fitted close to the steel container so that every available ounce of the slip is kept agitated.

The tank is served by an air pressure line (3) and a vacuum line (4) with valves so disposed as to permit the vacuum to be shut off and pressure admitted, or vice versa, at will. Vacuum and pressure gauges indicate the respective values.

At the bottom of the tank is a large valve (5) which delivers the slip to a rubber hose (8). At the top of the tank is a large, quick-opening valve (6) to release either vacuum or pressure.

The operation of the system is as follows: The correctly made slip is introduced into the pressure agitator tank from the storage agitator by means of an interconnected valve (7) and pipe line connected with the bottom of the pressure agitator tank. Vacuum is established in the latter in order that the slip may be drawn into the tank from the bottom upward to avoid the introduction of air bubbles in the operation. When the tank is nearly full, as determined by simple flow control meters, the valve is closed and vacuum is run up to twenty-five inches. As the agitator slowly revolves, the vacuum draws out any occluded air bubbles leaving the slip in a very uniform and extremely dense physical condition. Usually fifteen minutes is sufficient to complete the vacuum treatment.

At the close of the vacuum treatment, the large valve (6) at the top of the tank is opened, the agitator having been momentarily stopped while the air rushes in. The large valve is then closed and pressure is introduced, after starting the agitator The rubber hose (8) at the bottom of the tank leads to the inlet nozzles of the molds (11) through convenient gang connections (9) made up with standard pipe fittings. The nozzles are of standard galvanized iron pipe nipples (10) cast into the plaster molds at the bottom. There is no outlet for the air at the top of the mold other than the leakage through the joint (11ª) where the two halves of the mold come together. This is purposely done since it is desired to have the heavy slip rise in the molds under some back-pressure which tends to prevent surges of the slip.

In filling the molds, it is desirable to merely "crack" the valve so that the slip flows upward from the bottom of the mold in a steady but slowly rising stream.

Prior to filling the molds, the bench (12) on which the molds rest, must be set into vibration A convenient means for accomplishing this is illustrated in the drawing which shows a diagrammatic view of the vibrating bench with its molds. The vibration is conveniently imparted by means of an unbalanced pulley (14) on a rapidly rotating shaft (15) driven by a motor (16). The bench rests on rubber cushions (13) at the corners in order that vibration may be made effective over the entire surface. It is well to have considerable weight in the bench in order that a positive and uniform vibration may be given to the molds clamped to its surface, the hose (8) at the same time being vibrated.

The pressure to be used depends upon the composition of the slip and upon the shape and size of the castings to be made. As an example, cylinders 2½ inches diameter by 10 inches in length require twenty pounds pressure for twenty minutes to acquire solidity when cast from a typical, non-plastic slip of ninety per cent solids and ten per cent clay, the whole being ground to pass a 200 mesh screen. The same body, if free cast by the ordinary method using slip of low viscosity, requires seven hours to reach solidity in the same size of mold.

Having thus described my invention, what I claim as new and desire to secure by Letters Patent of the United States is:—

1. In apparatus of the class described, in combination, a mold, a source of supply of ceramic slip, means to conduct the slip from the source to the mold, and means to maintain the slip in agitation at the source, in the conducting means, and in the mold, during the operation of flowing the slip to and into the mold.

2. In apparatus of the class described, in combination, a mold, a source of supply of ceramic slip, means to conduct the slip from the source to the mold, and means to maintain the slip in agitation at the source, means to maintain the slip in agitation in the conducting means, and in the mold, during the operation of flowing the slip to and into the mold, and comprising instrumentalities for vibrating the mold and conducting means.

3. In apparatus of the class described, in combination, a mold, a source of supply of ceramic slip, means to conduct the slip from the source to the mold, means to maintain the slip in agitation at the source, means to maintain the slip in agitation in the conducting means, and in the mold, during the operation of flowing the slip to and into the mold, comprising a resiliently mounted support for the mold, and means to vibrate said support to correspondingly actuate the mold while the slip is supplied thereto.

4. Apparatus for handling a ceramic slip which is fluid when agitated and becomes solid when agitation ceases, comprising a tank with means for agitating the slip therein, means for conducting the slip from the tank to a point of use, and means to maintain the slip in a state of agitation while so conducted.

5. Apparatus for handling a ceramic slip which is fluid when agitated and becomes solid when agitation ceases, comprising a tank with means for agitating the slip therein, means for conducting the slip from the tank to a point of use, means to maintain the slip in a state of agitation while so conducted, and means to apply a vacuum to the tank to draw the slip thereinto.

6. Apparatus for handling a ceramic slip which is fluid when agitated and becomes solid when agitation ceases, comprising a tank with means for agitating the slip therein, means for conducting the slip from the tank to a point of use, means to maintain the slip in a state of agitation while so conducted, and means to apply a vacuum to the tank to remove therefrom occluded air preliminary to conducting the slip from the tank.

7. Apparatus for handling a ceramic slip which is fluid when agitated and becomes solid when agitation ceases, comprising a tank with means for agitating the slip therein, means for conducting the slip from the tank to a point of use, means to maintain the slip in a state of agitation while so conducted, and means to apply a vacuum to the tank to draw the slip thereinto and to remove therefrom occluded air preliminary to conducting the slip from the tank.

8. Apparatus for handling a ceramic slip which is fluid when agitated and becomes solid when agitation ceases, comprising a tank with means for agitating the slip therein, means for conducting the slip from the tank to a point of use, means to maintain the slip in a state of agitation while so conducted, means to apply a vacuum to the tank to draw the slip thereinto, and means to relieve the vacuum and subsequently apply pressure to the slip in the tank to force it through the conducting means.

9. Apparatus for handling a ceramic slip which is fluid when agitated and becomes solid when agitation ceases, comprising a pressure tank, means to maintain slip therein in agitation, means to apply a vacuum to said tank to draw the slip into the same, means for relieving the vacuum and admitting atmospheric air pressure to the tank, and means for subjecting the slip in the tank to a motive fluid under pressure for dispensing the contents of the tank.

10. Apparatus for handling a ceramic slip which is fluid when agitated and becomes solid when agitation ceases, comprising a tank with means for agitating the slip therein to maintain it fluid, and means to apply pressure to the slip in such condition to dispense it from the tank.

11. Apparatus for handling a ceramic slip which is fluid when agitated and becomes solid when agitation ceases, comprising a tank with means for agitating the slip therein to maintain it fluid, means to apply pressure to the slip in such condition to dispense it from the tank and convey it to the point of use thereof, and means to simultaneously agitate the slip and form it into a desired shape after it is so dispensed.

12. In apparatus of the class described, in combination, a mold, a source of supply of ceramic slip, means to conduct the slip from the source to the mold, and means to maintain the slip in agitation at the source, means to maintain the slip in agitation in the conducting means, and in the mold, during the operation of flowing the slip to and into the mold, comprising a resiliently mounted table supporting the mold and the conducting means, with an instrumentality to vibrate the table and said conducting means along therewith.

13. Apparatus for handling a ceramic slip which is fluid when agitated and becomes solid when agitation ceases, comprising a tank with means for agitating the slip therein, means to draw the slip into the tank, and pressure means to dispense it from the tank.

14. Apparatus for handling a ceramic slip which is fluid when agitated and becomes solid when agitation ceases, comprising a tank with means for agitating the slip therein, and means to subject the slip to the action of a fluid medium to draw it into the tank, and force it therefrom for dispensing to a place of use.

15. Apparatus for handling a ceramic slip which is fluid when agitated and becomes solid when agitation ceases, comprising a tank with means for agitating the slip therein, and means to subject the slip to the action of a fluid medium to draw it into the tank from the bottom of the tank upwards.

16. Apparatus for handling a ceramic slip which is fluid when agitated and becomes solid when agitation ceases, comprising a tank with means for agitating the slip therein, and means to subject the slip to the action of a fluid medium to draw it into the tank and express occluded air therefrom.

In testimony whereof I affix my signature.

THOMAS S. CURTIS.